United States Patent [19]

Fairbanks et al.

[11] 4,287,380

[45] Sep. 1, 1981

[54] ELECTRODE ASSEMBLY FOR MOLTEN GLASS FOREHEARTH

[75] Inventors: Richard E. Fairbanks, Manchester; James F. Stevenson, West Hartford; John F. Blumenfeld, Simsbury, all of Conn.

[73] Assignee: Emhart Industries, Inc., Farmington, Conn.

[21] Appl. No.: 76,580

[22] Filed: Sep. 18, 1979

[51] Int. Cl.[3] .................... C03B 5/02

[52] U.S. Cl. .................... 13/6

[58] Field of Search .................... 13/6, 25

[56] References Cited

U.S. PATENT DOCUMENTS

| | | | |
|---|---|---|---|
| 2,209,515 | 7/1940 | Ehman et al. . | |
| 2,933,545 | 4/1960 | Keefer . | |
| 3,384,697 | 5/1968 | Fouse | 13/6 |
| 3,777,040 | 12/1973 | Gell et al. | 13/6 |

*Primary Examiner*—Roy N. Envall, Jr.

*Attorney, Agent, or Firm*—McCormick, Paulding & Huber

[57] ABSTRACT

A molybdenum electrode is mounted in a stepped aperture in the sidewall of the forehearth such that the inner end portion of the electrode is immersed in the molten glass where the molybdenum is effectively isolated from oxidizing agents. The outer end portion of the electrode is shielded in a high temperature alloy steel sleeve, which sleeve is spaced from the electrode to provide an annular space therebetween. A ceramic fiberous material is provided between the inner end of the sleeve and the electrode, and a high temperature alloy steel plug is threadably secured to the outer ends of both the sleeve and the electrode to seal the outer end of this annular space, and to serve as an electrical terminal for the electrode. The molten glass solidifies inside the sleeve's inner end to seal the inner end of the sleeve. The assembly is clamped to the furnace framework by an insulated bracket adjacent the outer end of the sleeve, which bracket is designed to thrust the assembly inwardly so that an annular flange on the sleeve abuts the sidewall of the refractory channel, which sidewall defines the step in the aperture of the furnace forehearth sidewall itself.

12 Claims, 3 Drawing Figures

ELECTRODE ASSEMBLY FOR MOLTEN GLASS FOREHEARTH

SUMMARY OF THE INVENTION

This invention relates to electrode holders, and deals more particularly with an electrode assembly adapted for use with an electrode passing through the sidewall of the furnace forehearth, which electrode comprises part of an electrical circuit for passing Joule effect heating current to the molten glass in the furnace.

Joule effect heating by the passage of electrical current through a body of molten glass is well known in the art of glass making, and is often used in the glass melting furnace, or in a furnace forehearth, either to supplement a gas or oil heating means, or to provide all the energy required for the melting or heating of the glass. Molybdenum is currently used for electrodes which must be immersed in the glass to achieve this Joule effect heating, and the electrode is usually inserted through an aperture in the refractory wall of the furnace such that a portion protrudes beyond the wall so as to be adapted for connection to a source of electrical power. While the glass material itself forms a suitable barrier around the molybdenum inside the forehearth channel, effectively preventing oxidation even at temperatures above 2,000° F., oxidation has been encountered in the zone where these electrodes extend through the sidewall of the hot furnace and are in contact with air at a temperature in excess of 750°. To avoid rapid oxidation present practice usually requires some type of forced fluid cooling to the electrode in this zone.

The general object of the present invention is to provide an electrode assembly for supporting an electrode in the sidewall of the furnace without the necessity for such cooling.

A more particular object of the present invention is to provide an electrode assembly of the type mentioned in the preceding paragraph wherein the molybdenum electrode is surrounded by a high temperature alloy steel sleeve spaced from the electrode, but sealed at each end of the sleeve. It has been found that certain elements, such as nickel tend to migrate into the molybdenum if there is physical contact between alloy steels and molybdenum at temperatures above 750° F. Therefore, the present invention obviates this propensity for migration, and also obviates the oxidation formerly encountered with prior art designs when no cooling was applied to the zone of the electrode external to the refractory material in the furnace sidewall.

In the electrode assembly of the present invention a tubular sleeve of high temperature alloy steel is provided in radially spaced relationship to a generally cylindrical molybdenum electrode. The inner end of this sleeve is sealed by the hardening of the molten glass in this area and a high temperature ceramic spacer material supports the electrode at the inner end of the sleeve so that the spacer and the glass will support the electrode in spaced relation to this sleeve. The outer end of the sleeve is directly connected to the outer end of the electrode by a high temperature alloy steel plug, which plug also serves as an electrical connection between the electrical lead wire and the electrode itself.

Thus, the annular space between the sleeve and the electrode is effectively sealed from the atmosphere with the result that what little oxygen is allowed to remain in the annular space is quickly consumed by very slight initial oxidation of the molybdenum. The high temperature alloy steel sleeve has an annular flange associated with its exterior surface such that the entire electrode assembly can be clamped in place by thrust brackets associated with the outer end of the sleeve and exerting an inwardly directed thrust force on the entire assembly to maintain the electrode in the desired position relative to the furnace sidewall.

DETAILED DESCRIPTION

Figures 1, 2, 3:
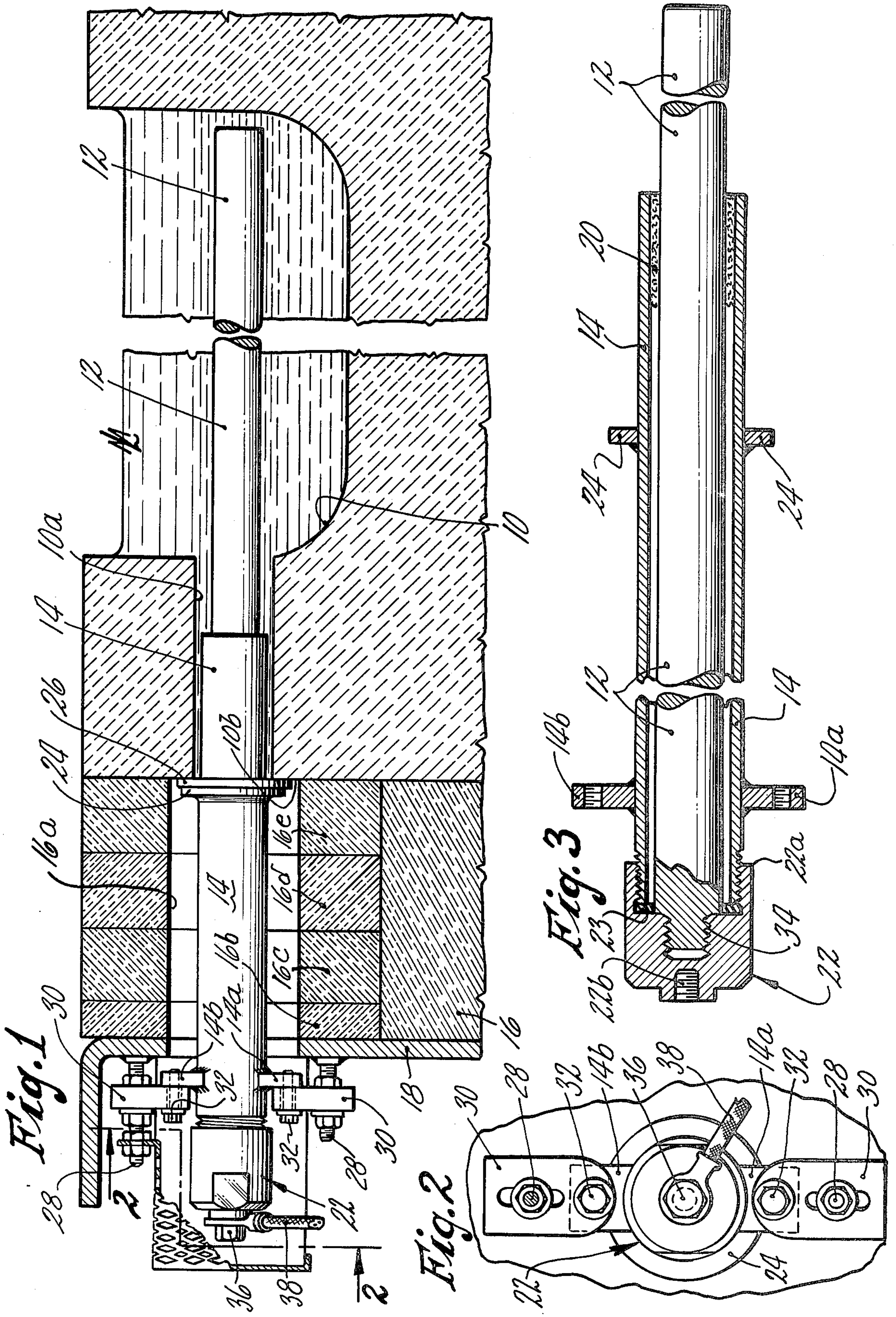
FIG. 1 is a vertical sectional view taken through the furnace forehearth at a point where the electrode assembly is mounted in the sidewall of the furnace and illustrates the elongated electrode in extended longitudinal relationship across the forehearth channel. Portions of the apparatus of FIG. 1 are shown broken away in order to reveal the construction of the electrode assembly.
FIG. 2 is a sectional view taken generally on the line 2—2 of FIG. 1.
FIG. 3 is a longitudinal sectional view through the electrode assembly of FIG. 1.

Turning now to the drawing in greater detail, FIG. 1 shows a molten glass forehearth channel 10 constructed of refractory material adapted to withstand the temperature of the molten glass (approximately 2,000° to 2,400° F.) and this channel serves to provide a conduit for the molten glass between the melting tank or furnace and a feeder bowl or other outlet means provided at the downstream end of the channel. The melting tank, the forehearth, and the feeder comprise conventional components which need not be described in detail herein.

The refractory forehearth channel defines a laterally extending aperture, or opening 10*a*, for receiving the elongated electrode 12, and its associated sleeve 14 to be described. The aperture 10*a* in the refractory channel sidewall comprises part of a somewhat larger aperture 16*a* provided in the insulated portion of the forehearth sidewall, and in axial alignment with the aperture 10*a*. The larger aperture 16*a* defined in the insulated portion 16 of the furnace forehearth sidewall, is more particularly defined by annular insulating blocks 16*b*, 16*c*, 16*d* and 16*e*. Forehearth constructions generally include both refractory material, where the molten glass contacts the structure itself, and insulating material, external to the refractory material, as well as a metal framework, such as indicated at 18 in FIG. 1. The metal framework retains both the insulation 16 and refractory components 10 in assembled relationship with one another.

By way of summary then, the furnace forehearth shown in FIG. 1 includes a sidewall which defines a stepped aperture or opening (16*a* and 10*a*) with the exterior of the refractory portion 10 defining an outwardly facing surface 10*b* to be referred to hereinafter in connection with the electrode assembly to be described.

Turning now to a more complete description of the electrode 12 and its associated sleeve 14, it will be apparent that the electrode 12 is in contact with the molten glass for a substantial portion of its length, and more particularly throughout its entire inner portion which extends across the forehearth channel as shown in FIG. 1. It is characteristic of such electrodes, particularly those which are made from a molybdenum material, that molybdenum tends to oxidize at the elevated temperatures characteristic of molten glass generally, but that the molten glass prevents such oxidation where the electrode is surrounded by molten glass rather than air, or some other oxidizing atmospheric environment. It is a feature of the present invention that the molybdenum electrode 12 is surrounded by a high temperature alloy steel sleeve 14 which sleeve is mounted in spaced relationship to the electrode as best shown in FIG. 3 in order to provide an annular space between the sleeve 14 and the electrode 12. This annular space is formed or defined by a high temperature rope ceramic material, such as FIBERFRAX, made by The Carborundum Company, as indicated generally at 20, adjacent the inner end of the sleeve 14, and is made airtight in this area by the hardened molten glass which will penetrate this material 20 to some extent. The outer end of the sleeve is supported by the plug 22 as best shown in FIG. 3. The annular space between the steel sleeve 14 and the electrode not only isolates that atmosphere surrounding the electrode 12, to prevent excessive oxidation of the molybdenum electrode itself, but also serves to keep the sleeve out of contact with the molybdenum electrode 12 especially that portion of the electrode 12 likely to be at an elevated temperature and subjected to migration of contaminants from the high temperature alloy steel sleeve 14 to the surface of the molybdenum electrode 12. It is noted that only in the extreme outer end portion of the electrode 12 does the electrode come in contact with the high temperature alloy steel plug material, and at this point on the electrode 12 the temperature will normally be well below the 750° temperature at which migration of contaminant materials into molybdenum is likely to occur.

Still with reference to the high temperature alloy steel sleeve 14, an annular flange 24 is provided outside the sleeve 14 and this flange is preferably fitted with a gasket of heat resistant material, similar to the material used to pack the space between the inner end of the sleeve 14 and the electrode 12 as referred to above at 20. FIG. 1 shows an annular gasket 26 of this material, and also illustrates this high temperature resistant material 26 in contact with the molten glass in the forehearth channel, which molten glass will have hardened in the space between the outside of the sleeve 14 and the inside wall of the aperture 10*a* of the refractory 10 during normal operation of the furnace forehearth.

As best shown in FIG. 1 the high temperature alloy steel sleeve 14 has diametrically opposed flange defining means 14*a* and 14*b* welded to the exterior wall of the sleeve 14 in order to provide a convenient connection with the mounting means for the electrode assembly, such that the electrode assembly can be thrust inwardly of the furnace in order that the gasket 26 will achieve an effective seal between the annular flange 24 and the stepped shoulder portion 10*b* of the aperture in the furnace sidewall.

Turning next to a more complete description of the means for so mounting the electrode assembly to the furnace framework 18, FIG. 1 shows two threaded studs 28, 28 having their head portions welded to the steel framework 18 of the furnace in spaced relationship to the aperture 16*a* in the furnace sidewall referred to previously. These threaded studs 28, 28 are adapted to receive openings in electrical insulator blocks 30, 30 which blocks have their inner ends bolted to the projecting ears 14*a*, and 14*b* by fasteners indicated generally at 32 in FIG. 1. As so constructed and arranged, the electrode assembly can be effectively clamped into the stepped aperture in the sidewall of the forehearth so as to thrust the sleeve 14 inwardly of the furnace and achieve a seal between the flange 24 and the refractory sidewall portion 10*b*.

Turning next to a more complete description of the high temperature alloy steel plug 22 and referring particularly to FIG. 3, it will be apparent that this plug 22 contacts the molybdenum electrode 12 only in the area of the threaded connection 34 therebetween. The plug 22 defines a female threaded opening to receive the threaded end portion of the molybdenum electrode 12, and the plug 22 further includes an annular portion 22*a* also defining a female threaded portion so as to threadably receive the end portion of the high temperature alloy steel sleeve 14. The male thread of sleeve 14 is preferably provided with a high temperature thread sealant such as NEVER-SEEZ made by a company of the same name located in Broadview, Ill. 60155. An asbestos gasket 23 is provided between the end of the sleeve 14 and the plug 22.

This construction affords an effective airtight seal between the sleeve 14 and the electrode 12 with the result that any trapped air between the sleeve 14 and the electrode 12 will have its oxygen quickly used up during initial operation of the electrode assembly in a furnace. Oxidation will be prevented by virture of the fact that airtight seals are afforded by the plug 22 at the outer end of the electrode assembly, and by the congealed glass at the inner end of the sleeve 14, in an improved construction which also avoids any migration of the nickel in the high temperature alloy steel sleeve 14 to the relatively high temperature portion of the electrode 12.

Still with reference to the plug 22 an outwardly open threaded aperture 22*b* is provided for receiving a threaded electrical connector screw 36 associated with the lead wire 38. This configuration provides a path for the electrical energy to the electrode 12 passing through the high temperature alloy steel plug 22 from the electrical connector screw 36 to the outer end of the electrode 12. Thus, the high temperature alloy steel plug 22 serves to support the electrode and the sleeve 14 in spaced relationship to one another, and to seal the annular space between these elements at least at the outer end thereof, and also serves to provide an electrical series connector between the screw 36 and the electrode itself.

We claim:

1. An electrode assembly adapted to be mounted to the framework of a furnace forehearth, and to extend through a stepped aperture defined in the furnace sidewall below the normal level of the molten glass contained therein, said electrode assembly comprising a tubular sleeve of inert high temperature nickel alloy steel material and having an outside diameter which is less than the diameter of the smaller portion of the stepped aperture in the furnace sidewall, said sleeve having radially projecting flange means intermediate its ends which flange means is adapted to abut the stepped portion of the aperture in the furnace sidewall, said flange means including a gasket for abutting the shoulder of the stepped aperture in the furnace sidewall, means for mounting said sleeve to the furnace framework so that the sleeve is clamped axially inwardly of the furnace sidewall aperture to thrust said flange means against the shoulder of the stepped aperture in the furnace sidewall, an elongated electrode of readily oxidizable material positioned inside said sleeve and having an inner end projecting into the molten glass, said electrode having a diameter significantly less than the inside diameter of said sleeve, a plug for connecting the outer end of said electrode to the outer end of said sleeve so that the electrode is oriented in spaced coaxial relationship inside said sleeve to define an annular space therebetween, and non-metallic spacer means between the inner end of said sleeve and said electrode to support the electrode coaxially of said sleeve and to block the flow of molten glass into said annular space by reason of the glass hardening between said electrode said sleeve and said spacer means.

2. The combination defined by claim 1 wherein said plug is metal and forms a closure for the outer end of said sleeve, and wherein said electrode is of a molybdenum material has an outer end secured to the inside of said metal plug such that the plug is in electrical series circuit with the electrode, and such that the steel sleeve does not contact said electrode in the area of said non-metallic spacer.

3. The combination defined by claim 2 wherein said plug is threadably secured to said sleeve, and wherein said electrode outer end is threadably secured to said plug, said plug and sleeve both fabricated from nickel steel.

4. The combination defined by claim 1 wherein said means for mounting said sleeve to the furnace framework more particularly comprises radially outwardly projecting support brackets secured to said sleeve adjacent its outer end, said sleeve mounting means further includes support blocks of electrical insulating material releasably secured to said support brackets and having openings to receive threaded studs fixed in said furnace framework adjacent the outer portion of the stepped aperture which receives the electrode assembly, and nuts adapted to be threadably received on said studs in order to clamp said blocks inwardly so that said flange means on said sleeve is thrust against the stepped shoulder portion of the furnace sidewall aperture.

5. The combination defined by claim 4 wherein said plug forms a closure for the outer end of said sleeve, and wherein said electrode has an outer end secured to the inside of said plug such that the plug is in electrical series circuit with the electrode, and such that the sleeve does not contact said electrode.

6. The combination defined by claim 5 wherein said plug is threadably secured to said sleeve, and wherein said electrode outer end is threadably secured to said plug.

7. The combination defined by claim 6 wherein said plug has an inwardly open female threaded bore to receive a threaded male portion of said electrode, and wherein said plug has an outwardly open threaded bore, the inner end of which is in closely spaced axial relation to the inwardly open threaded bore and such that said outwardly open threaded bore is adpated to receive an electrically conductive screw associated with a lead wire suitable for energizing the electrode assembly.

8. The combination defined by claim 2 wherein said means for mounting said sleeve to the furnace framework more particularly comprises radially outwardly projecting support brackets secured to said sleeve adjacent its outer end, said sleeve mounting means further includes support blocks of electrical insulating material releasably secured to said support brackets and having openings to receive threaded studs fixed in said furnace framework adjacent the outer portion of the stepped aperture which receives the electrode assembly, and nuts adapted to be threadably received on said studs in order to clamp said blocks inwardly so that said flange means on said sleeve is thrust against the stepped shoulder portion of the furnace sidewall aperture.

9. The combination defined by claim 8 wherein said plug forms a closure for the outer end of said sleeve, and wherein said electrode has an outer end secured to the inside of said plug such that the plug is in electrical series circuit with the electrode, and such that the sleeve does not contact said electrode.

10. The combination defined by claim 9 wherein said spacer means comprising a material characterized by its resistance to high temperature nickel migratory characteristics, said nickel steel sleeve being susceptible to nickel migration when in contact with molybdenum alloys, at least at elevated temperatures.

11. The combination defined by claim 10 wherein said non-metallic spacer means comprises a ceramic fiberous material.

12. An electrode assembly adapted to be mounted to the framework of a furnace forehearth, and to extend through an aperture defined in the furnace sidewall below the normal level of the molten glass contained in the channel of the furnace, said electrode assembly comprising (a) a tubular sleeve of inert high temperature nickel alloy steel material and having an outside diameter which is less than the diameter of the aperture in the furnace sidewall, (b) means for mounting said sleeve in the furnace sidewall aperture so that the molten glass is adapted to harden around the outside of said sleeve and forms a seal for the molten glass inside the furnace channel, (c) an elongated electrode of readily oxidizable molybdenum material positioned inside said sleeve and having an inner end projecting into the molten glass, said electrode having a diameter significantly less than the inside diameter of said sleeve, and means between the inner end of said sleeve and said electrode to support the electrode coaxially of said sleeve prior to said glass hardening, said means comprising a high temperature ceramic fibrous packing, (d) a plug also of nickel alloy steel for connecting the outer end of said electrode to the outer end of said sleeve so that the electrode is oriented in spaced coaxial relationship inside said sleeve to define an annular space therebetween, and said annular space sealed by said plug at the outer end and by molten glass and said fibrous packing means at the inner end of said sleeve.

* * * * *